United States Patent [19]

Amit

[11] 3,708,194
[45] Jan. 2, 1973

[54] VEHICLE SAFETY APPARATUS

[76] Inventor: Aster Ma. Amit, 339-B Pasadena Avenue, South Pasadena, Calif. 91030

[22] Filed: May 24, 1971

[21] Appl. No.: 146,361

[52] U.S. Cl..................293/1, 293/69 R, 293/71 P, 280/150 AB, 169/2 A
[51] Int. Cl...........................B60r 19/10, B60r 21/02
[58] Field of Search .293/1, 69 R, 71 P; 280/150 AB; 169/2 R, 2 A, 9, 11, 31; 9/11, 14, 311, 312, 314, 316; 244/107, 140; 152/415, 416, 417

[56] References Cited

UNITED STATES PATENTS

| 3,588,142 | 6/1971 | Gorman | 280/150 AB |
| 2,859,048 | 11/1958 | Munn | 280/150 AB |
| 3,481,625 | 12/1969 | Chute | 280/150 AB |
| 3,197,234 | 7/1965 | Bertrand | 280/150 AB |
| 3,146,460 | 9/1964 | Henderson | 2/2 |
| 1,995,088 | 3/1935 | Bellamy | 293/69 R |
| 3,338,614 | 8/1967 | Sadler, Jr. | 293/69 R |
| 3,603,535 | 9/1971 | DePolo | 280/150 AB |

*Primary Examiner*—Gerald M. Forlenza
*Assistant Examiner*—Robert Saifer
*Attorney*—Jackson & Jones

[57] ABSTRACT

A safety apparatus is disclosed in which an inflatable is provided for the front of an automobile to provide a cushion for the vehicle and its passengers during a collision. The inflatable is connected to a supply of compressed fluid and is enclosed by a cover during non-use, which is adapted to be detachably opened upon inflation of the inflatable. The supply of compressed fluid can also be utilized for fire extinguishing purposes.

17 Claims, 4 Drawing Figures

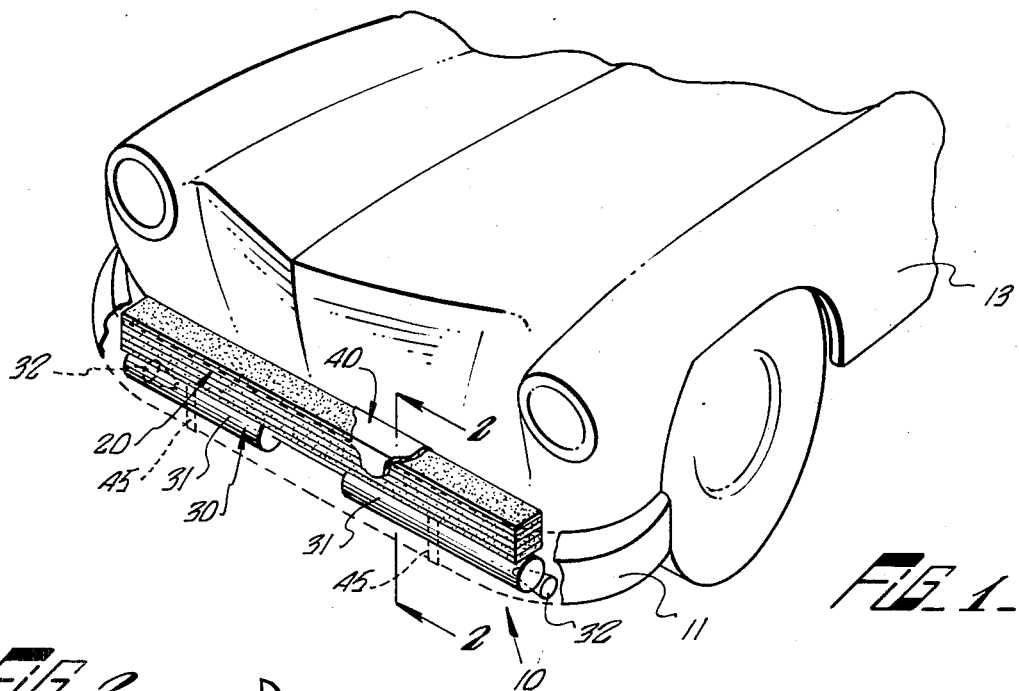
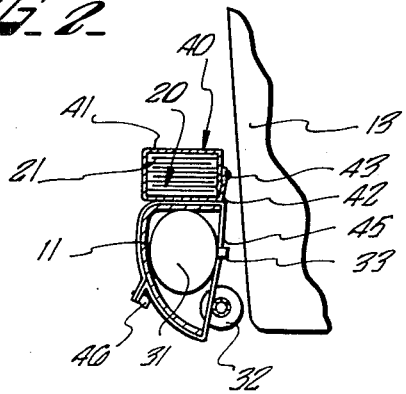

VEHICLE SAFETY APPARATUS

BACKGROUND OF THE INVENTION:

1. Field of the Invention

The present invention relates to a vehicle safety apparatus and more particularly to a safety apparatus that is adapted to be mounted on the vehicle bumper to protect the vehicle and its occupants during a collision.

2. Description of the Prior Art

Because of the public demand for greater safety in automobiles, there have been many recent proposals advanced to make automobile driving and riding safer.

Many of these proposals deal with devices which are utilized for aiding in the protection of the vehicle and its passengers during a collision.

Seat belts and harness belts, of course, are highly recommended for preventing injury during a collision. However, other proposals have been advanced which supplement these devices.

One proposal utilizes a protective inflatable which is stored in the dash of the automobile. Just prior to impact, the inflatable is filled with compressed air to expand and completely fill the area between the dash and the passenger in order to cushion the forward movement of the passenger.

A shortcoming with such a proposal is that the inflatable itself could cause bodily damage to the passenger. This could occur if the passenger were smoking a cigar, cigarette, or pipe, for such an object might easily be thrust against the passenger or into his mouth, upon contact with the inflatable. This problem could even occur if the passenger were wearing eye glasses. Serious eye damage could result if the glasses would shatter upon contact with the inflatable.

Other proposals have concentrated on exterior devices which serve to give extra protection to the vehicle during a collision.

One proposal which has been given serious consideration for future use is the water bumper. The bumper comprises an oversized collapsible metal chamber having a quantity of water contained therein. A plurality of valves is mounted on the chamber for relieving the water pressure buildup during impact.

Although used successfully, the water bumper has not been widely accepted, mainly because it is useful only at very low speeds. As a result, the water bumper may prevent some automobile body damage at slow speeds, but it does not help prevent bodily harm to the passengers at normal or high speeds.

SUMMARY OF THE INVENTION

The present invention obviates the above-mentioned shortcomings by providing a vehicle safety apparatus that is efficacious in most driving speeds. The apparatus comprises an inflatable having an inlet connected to an outlet of a container having a supply of compressed fluid. The inflatable is adapted to be folded during non-use with a cover being provided to cover the inflatable during this period.

In the preferred embodiment, the container comprises a modified fire extinguisher having a pair of outlets, one outlet leading to the inflatable with the other leading to an ejection nozzle. The cover comprises a layer of canvas adapted to be detachably opened upon inflation of the inflatable.

An important advantage of the present invention is that the inflatable provides a cushion for the automobile that is able to withstand impacts at speeds approximately up to 25 miles per hour.

Another important advantage of the present invention is that the inflatable also can serve as a floating buoyancy agent in case the vehicle plunges into water.

Still another advantage of the present invention is that the container may be easily disconnected from the system to function as a fire extinguisher.

Another advantage of the present invention is that the cover for the apparatus can be made to blend with the appearance of the automobile bumper.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS:

FIG. 1 is a perspective view of a vehicle safety apparatus of the present invention;

FIG. 2 is a cross sectional view of the apparatus taken along lines 2—2 of FIG. 1;

FIG. 3 is a perspective view of the safety apparatus in its inflated position; and FIG. 4 is an enlarged fragmentary view of a portion of the fluid supply means.

DESCRIPTION OF THE PREFERRED EMBODIMENT:

Referring now to the drawings, FIGS. 1 and 2 show a vehicle safety apparatus, generally indicated by arrow 10, positioned adjacent the front bumper 11 of an automobile 13.

Basically the apparatus 10 comprises three main components: (1) an inflatable 20; (2) a compressed fluid supply 30; and (3) a cover assembly 40.

The inflatable 20 comprises a resilient balloon-like container 21 preferably made of a multiplicity of layers of stretch nylon, natural rubber and neoprene, or any other like material. During non-use, the container 21 is adapted to be arranged in folds to be mounted on top of the bumper 11.

The compressed fluid supply 30 comprises a pair of elongated containers 31 arranged to be stored immediately behind the bumper 11. It should be noted that on some model automobiles, there is insufficient space behind the bumper to receive the containers 31. In these instances, the containers 31, along with the rest of the apparatus 10, are mounted on top of the bumper 11.

In the preferred embodiment, each container 31 is a modified fire extinguisher filled with a compressed foam or other similar fire extinguishing fluid which is pressurized to approximately 2,000 pounds per square inch. Each of the containers 31 is adapted to feed their supplies of compressed fluid into the inflatable 20 to inflate it to a position shown in FIG. 3. In this configuration, the inflatable 20 is expanded to a 3 feet diameter cylinder which covers the entire front end of the automobile to form a protective cushion for the automobile and its passengers during a collision.

As stated above, each of the containers 31 is a modified fire extinguisher, and, as such, includes an ejection nozzle 32 which functions to eject the foam under pressure to a target area for extinguishing any fires occurring at that area. Each container 31 further includes a strap enclosure 33 for receiving a strap 45 which is adapted to extend around the container 31, around the exterior of the bumper 11 and under the inflatable to secure the container 31 and the inflatable 20 thereto. A lock 46 is provided on the strap coupling exterior of the bumper 11 to enable the strap 45 to be opened and the container 31 removed.

FIG. 4 shows an enlarged view of the end of one of the containers 31. The end of each container 31 includes a dual outlet assembly with the first outlet conduit 34 being connected to a hose 35 which is, in turn, connected to the inflatable 20. An electrically operated butterfly valve 36 is mounted within the conduit 34 to open and close the flow of fluid therethrough. The valve 36 can be actuated by any one of a number of conventional switches such as an inertia switch, a manual switch, a speed responsive switch or a switch responsive to the depression of a brake pedal. A quick disconnect coupling 37 is used to couple the conduit 34 with the hose 35.

The dual outlet assembly also includes a second outlet 38 which is connected to the ejection nozzle 32. A hand operated trigger 39 is mounted on the conduit 38 to permit the container 31 to be operated manually.

The cover assembly 40 is comprised of a layer of canvas or of similar flexible materials. The bottom section of the layer 40 is secured by the strap 45 to the bumper 11. The layer 40 is adapted to completely enclose the folded inflatable 20 during non-use. In this stored position, the mating ends of the layer 40 comprise a plurality of snap attachments 43 for detachably coupling those ends together.

OPERATION

In the stored position, as shown in FIGS. 1 and 2, the containers 31 are ready for use in two modes.

The first mode is the individual fire fighting mode. In this mode, the driver or any other person, can approach the stored apparatus 10, unlock the strap 45 and remove the container 31 from beneath the bumper 11, while the inflatable 20 and cover 40 remain intact. Simultaneously, the operator detaches the quick disconnect coupling 37 to detach the container hose 34 from the hose 35 of the inflatable 20. The containers 31 are then completely detached to be utilized manually as fire extinguishers by aiming the nozzle 32 toward the flames and actuating the trigger 39 to initiate ejection of the foam.

The second mode of operation for the apparatus is the collision protection mode. In this mode, the inflatable 20 is inflated to a position shown in FIG. 3 to form a cushion across the entire front end of the automobile 13.

As stated above, this mode can be initiated by any of a number of conventional switches. Upon actuation of the switch to open the butterfly valve 36, or of similar devices, the compressed fluid within the containers 31 is caused to pass therethrough to inflate the inflatable 20. As the inflatable 20 begins to expand, the forces created by such expansion causes the snap attachments 43 to become uncoupled in order to separate and uncover the layers 41 and 42 of the cover assembly 40. In this position, the inflatable 20 is now free to fully expand to the position shown in FIG. 3. A cap 22 is provided on the inflatable 20 to function as an outlet for emptying the compressed fluid from the interior thereof. A plurality of air valves 50 are also formed on the inflatable 20 to relieve the buildup of pressure on the inflatable during impact.

It should be noted that various modifications can be made to the apparatus while still remaining within the purview of the claims. For example, if the cover assembly 40 cannot be attached to the bumper 11 of the automobile 13, the layer can be made of one piece to be wrapped completely around the bumper and attached at its mating ends. Moreover, the canvas cover can easily be chrome-plated to blend in with the appearance of the bumper of the automobile.

Regarding the containers 31, besides positioning them as described above, they can also be positioned within the automobile, behind the grill and before the radiator. In this configuration, the containers 31 are more secure while still being able to be easily removed by either raising the hood or opening the grill.

In either of the above-mentioned embodiments, a novel apparatus is set forth which provides a measure of safety to the automobile and its passengers not heretofore possible.

What is claimed is:

1. A dual purpose vehicle safety apparatus adapted to be attached to a vehicle for extinguishing fire and preventing damage resulting from impact comprising:
   a fire extinguishing fluid supply means including an enclosed container detachably mounted to the vehicle and containing a quantity of compressed fire extinguishing fluid;
   an inflatable member means for cushioning an impact operatively connected to the container of compressed fire extinguisher fluid;
   a first discharge conduit connecting the container and the inflatable member;
   means for releasing the fire extinguishing fluid into the inflatable member means for inflation purposes to prevent damage from impact;
   a fire extinguishing nozzle for directing the fire extinguishing fluid onto any fire to be extinguished; and
   a second discharge conduit connected to the container and the fire extinguishing nozzle for conveying the fire extinguisher fluid whereby a fire can be extinguished by the fluid.

2. The invention of claim 1 further including means for attaching the safety apparatus adjacent a front bumper of the vehicle.

3. The invention of claim 2 wherein the inflatable member means comprises a resilient container which is arranged in folds during non-use.

4. The invention of claim 2 further comprising means for removably covering the inflatable member means during non-use.

5. The invention of claim 4 wherein the removable cover means comprises fastening means for securing the cover means over the inflatable member means during non-use, the fastening means being detachable upon inflation of the inflatable member means.

6. The invention of claim 5 wherein the removable cover means comprises a layer of flexible material extending over the inflatable member means.

7. The invention of claim 6 wherein the flexible material is canvas.

8. The invention of claim 7 wherein the canvas is chrome plated to match the finish of the automobile bumper.

9. The invention of claim 7 wherein the inflatable member means further comprises valve means for relieving the buildup of pressure within the inflatable member means during impact.

10. A dual purpose vehicle safety apparatus adapted to be attached to a vehicle for extinguishing fire and preventing damage resulting from impact comprising:
a fire extinguishing fluid supply means including an enclosed container detachably mounted to the vehicle and containing a quantity of compressed fire extinguishing fluid;
an inflatable member means for cushioning an impact operatively connected to the container of compressed fire extinguisher fluid;
a first discharge conduit connecting the container and the inflatable member;
means for releasing the fire extinguishing fluid into the inflatable member means for inflation purposes to prevent damage from impact;
a fire extinguishing nozzle for directing the fire extinguishing fluid onto any fire to be extinguished;
a second discharge conduit connected to the container and the fire extinguishing nozzle for conveying the fire extinguisher fluid whereby a fire can be extinguished by the fluid;
a releasable coupling positioned downstream of the means for releasing the fire extinguishing fluid and capable of separating the inflatable member means from the container; and
means for selectively releasing the fire extinguishing fluid into the second discharge conduit.

11. The invention of claim 10 wherein the inflatable member means comprises a resilient container which is arranged in folds during non-use.

12. The invention of claim 10 further comprising means for removably covering the inflatable member means during non-use.

13. The invention of claim 12 wherein the cover means comprises fastening means for securing the cover means over the inflatable member means during non-use, the fastening means being detachable upon inflation of the inflatable member means.

14. The invention of claim 13 wherein the cover means comprises a layer of flexible material extending over the inflatable member means.

15. The invention of claim 14 wherein the inflatable member means further comprises valve means located on the inflatable member means for relieving the buildup of pressure within the inflatable member means during impact.

16. The invention of claim 14 wherein the flexible material is canvas.

17. The invention of claim 16 wherein the canvas is chrome plated to match the finish of the automobile bumper.

* * * * *